US012626061B1

(12) United States Patent
Aguilera et al.

(10) Patent No.: US 12,626,061 B1
(45) Date of Patent: May 12, 2026

(54) CONVERTING A PROCESS INDUSTRY STANDARD OPERATING PROCEDURE INTO A SIMULATABLE NON-AMBIGUOUS SINGLE STATE MACHINE ARCHITECTURE

(71) Applicant: Voovio Technologies SL, San Sebastian (ES)

(72) Inventors: Jaime Aguilera, Madrid (ES); Juan Bautista Gomez, Barcelona (ES); Fernando Alonso, Sunnyvale, CA (US); Jon Zamora, Renteria (ES); Christian McDermott, Houston, TX (US); Francis Montemurro, Midlothian, VA (US)

(73) Assignee: Voovio Technologies SL, San Sebastian (ES)

( * ) Notice: Subject to any disclaimer, the term of this patent is extended or adjusted under 35 U.S.C. 154(b) by 1009 days.

(21) Appl. No.: 17/670,788

(22) Filed: Feb. 14, 2022

Related U.S. Application Data

(60) Provisional application No. 63/149,893, filed on Feb. 16, 2021.

(51) Int. Cl.
| | |
|---|---|
| *G06F 9/448* | (2018.01) |
| *G06F 40/211* | (2020.01) |
| *G06F 40/284* | (2020.01) |

(52) U.S. Cl.
CPC .......... *G06F 40/211* (2020.01); *G06F 9/4498* (2018.02); *G06F 40/284* (2020.01)

(58) Field of Classification Search
CPC ..... G06F 9/4498; G06F 40/211; G06F 40/284
See application file for complete search history.

(56) References Cited

U.S. PATENT DOCUMENTS

| | | | | |
|---|---|---|---|---|
| 8,175,248 B2 * | 5/2012 | Agarwal | ............. | H04M 3/4931 |
| | | | | 379/218.01 |
| 8,930,180 B1 * | 1/2015 | Murray | ................... | G06F 40/10 |
| | | | | 704/10 |
| 10,430,447 B2 * | 10/2019 | Canim | ................... | H04L 67/306 |
| 10,446,137 B2 * | 10/2019 | Khan | .................... | G10L 15/063 |
| 2013/0158985 A1 * | 6/2013 | Castillo | ................... | G06F 40/40 |
| | | | | 704/9 |

* cited by examiner

*Primary Examiner* — Kris E Mackes
(74) *Attorney, Agent, or Firm* — Raubvogel Law Office

(57) ABSTRACT

Techniques are described for automatically converting a standard operating procedure (SOP) into a simulatable non-ambiguous single state machine (SSM) architecture in which a given input (transition condition) necessarily and unambiguously moves the system from a first state to a predictable second state. By converting a written SOP into a simulatable non-ambiguous SSM architecture, the techniques described herein reduce the possibility of errors and improve the safety, efficiency, and operational performance of the system. The described techniques also allow the architecture, and indeed the entire system, to be simulated.

27 Claims, 17 Drawing Sheets

700

| Initial command | Classification | Goal | Action |
|---|---|---|---|
| Wrong syntax (e.g., direct object not present) | A sentence can be confusing if the action (verb) and/or the object of the action (direct object) are not clearly specified | Identify component that operator needs to interact with (noun) and describe the action to be performed (verb) | Before: Stop the flow in the pipe<br>After: Close valve XYZ |
| Uses indefinite pronouns (e.g., all, some, etc.) | Indefinite pronouns do not describe individual objects to be acted upon | Eliminate indefinite pronouns by identifying each component by a unique identifier or name; assign an action for individual components | Before: Close all valves<br>After: Close valve 1, close valve 2, close valve 3 |
| Describes systems (e.g., pump, PLC, etc.) instead of components | Operator's actions are performed over single components, not systems | Assign actions to individual components | Before: Shut down the pump<br>After: Turn off switch X, close valve Y, open drain Z |
| Action requires knowledge or expertise about the component or action | Takes for granted knowledge of the system and the layout of its components | Actions should be clearly specified regardless of pre-existing knowledge or expertise | Before: Line up the pump<br>After: Open valve X, close drain Y, close valve Z |

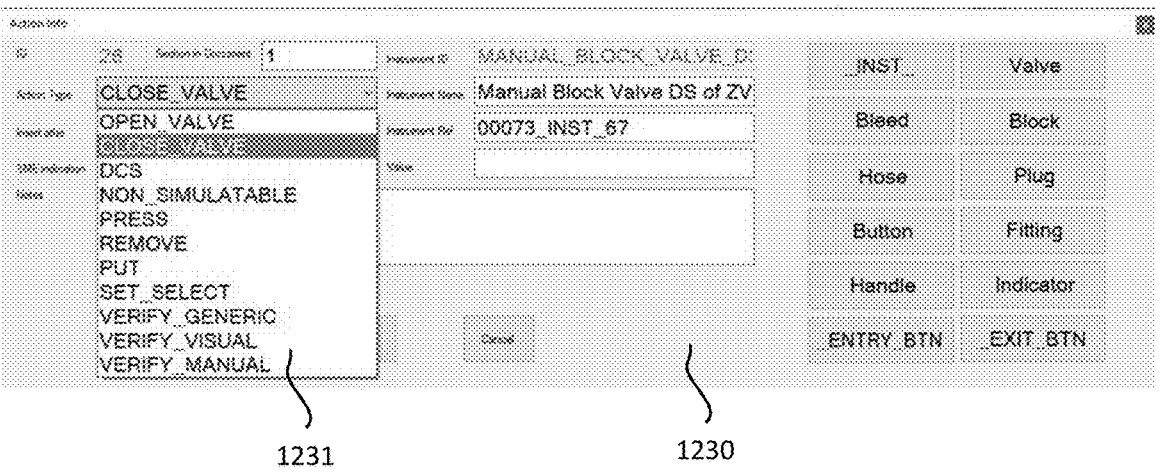
1231       1230
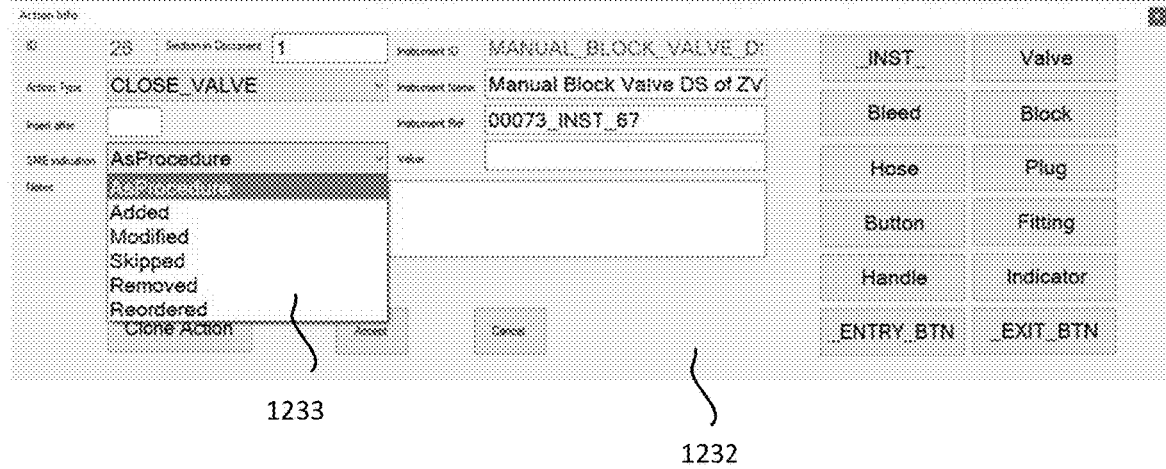
1233
1232
1235
1234
FIG. 12D

1300

1301
Start

1302
Tokenize text

1303
Apply Unigram Language Model

1304
Perform Part of Speech tagging

1305
Parse words and tags

1306
Apply ambiguity routine

1399
End

CONVERTING A PROCESS INDUSTRY STANDARD OPERATING PROCEDURE INTO A SIMULATABLE NON-AMBIGUOUS SINGLE STATE MACHINE ARCHITECTURE

CROSS-REFERENCE TO RELATED APPLICATION

The present application claims the benefit of U.S. Provisional Application Ser. No. 63/149,893 for "Converting a Process Industry Standard Operating Procedure into a Simulatable Non-Ambiguous Single State Machine Architecture", filed on Feb. 16, 2021, which is incorporated by reference herein in its entirety.

TECHNICAL FIELD

The present document relates to techniques for generating a single state machine architecture to unambiguously define a procedure.

BACKGROUND

A standard operating procedure (SOP) is a set of step-by-step instructions compiled by an organization to help operators carry out routine and non-routine operations. SOPs aim to achieve safety, efficiency, quality output, and uniformity of performance, while reducing miscommunication and failure to comply with industry regulations. SOPs are often used in the manufacturing industry, as a way to instruct operators as to proper equipment and process operations.

Conventionally, SOPs are often created from a piping and instrumentation diagram (P&ID) or similar diagram describing a series of steps to be performed. See, for example, Landon et al., U.S. Pat. No. 9,613,233, for Interactive Industrial Maintenance, Testing, and Operation Procedures.

Such conventional methods suffer from a number of deficiencies. The SOPs are a product of the process technology and are usually written by technical consultants or subject matter experts, and often rely on knowledge and expertise of a select few. As a result, the SOPs often include high-level generalizations, inconsistencies, and/or ambiguities, and fail to provide effective checks to prevent actions from being executed incorrectly. In general, SOPs do not include sufficient supporting guidance or information, such as images that might help illustrate details of the procedure and support mapping and understanding of the procedure to a real-world situation. This lack of procedure clarity results in operating practices that are not consistent with established SOPs.

SUMMARY

In various embodiments, the system and method described herein provide improved efficiency and reduced ambiguity by converting an SOP into a simulatable non-ambiguous single state machine (SSM) architecture. An example is shown in FIG. 1. In this manner, a given input (transition condition) necessarily and unambiguously moves the system from a first state (designated State A) to a predictable second state (designated State B).

In various embodiments, the system and method described herein are able to convert a written SOP into a simulatable non-ambiguous SSM architecture, thus reducing the possibility of errors and improving the safety, efficiency, and operational performance of the system.

The described techniques also allow the architecture, and indeed the entire system, to be simulated. More specifically, a SSM architecture can be simulated with a logic engine that is able to read and change the value of all the variables in the machine. In each state, the value of the variables specified, and when a transition condition is met (such as, for example, changing a value of a variable from 0 to 1), the system updates the variable values of the entire architecture.

Further details and variations are described herein.

BRIEF DESCRIPTION OF THE DRAWINGS

The accompanying drawings, together with the description provided below, illustrate several embodiments. One skilled in the art will recognize that the particular embodiments illustrated in the drawings and described herein are merely exemplary, and are not intended to limit scope.

FIG. 7 is a table depicting examples of methods for rewriting actions for an SOP, according to one embodiment.

FIGS. 12A through 12D are screen shots depicting an example of a user interaction with the interface of the described system, according to one embodiment.

DETAILED DESCRIPTION OF THE EMBODIMENTS

Figure 1:
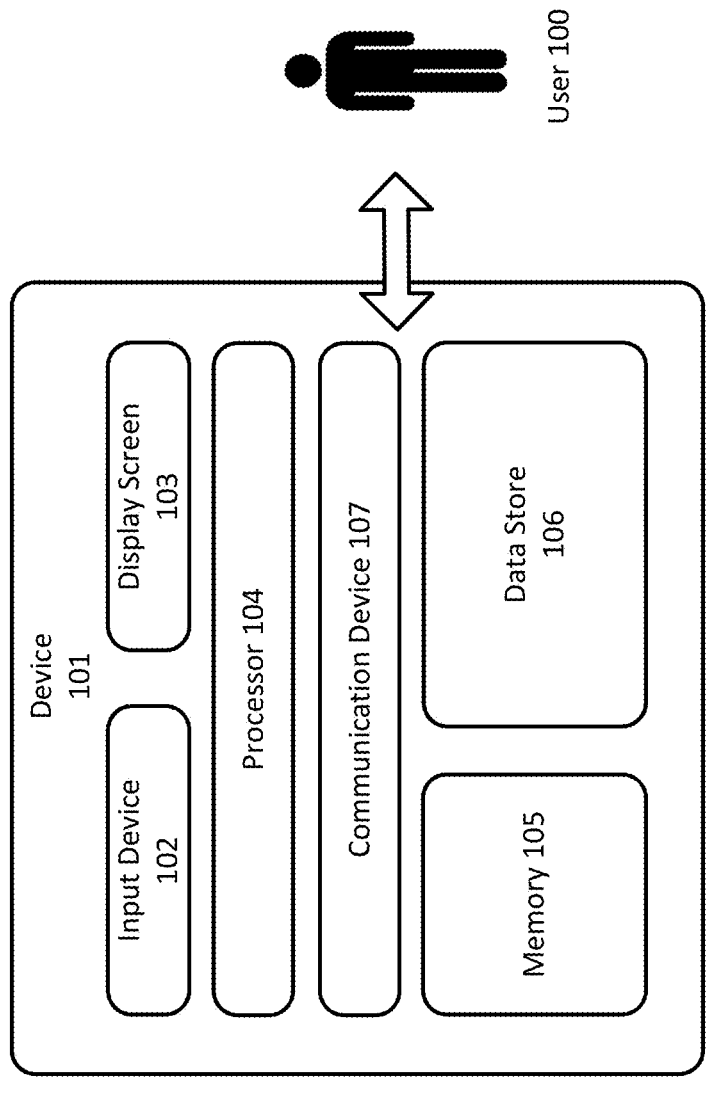
FIG. 1 is a block diagram depicting a hardware architecture for implementing the techniques described herein according to one embodiment.

The systems and methods set forth herein may be applied to many contexts in which it can be useful to generate a single state machine (SSM) architecture; such techniques may be applicable to any process. For illustrative purposes, the techniques are described in connection with a process that transforms a material (input) into another material (output), for example by applying pressure and temperature, and/or by adding other materials. Such processes may take place using complex equipment and/or assets that may be managed by human operators, either by means of a digital control system (DCS) or by manual intervention/control. One skilled in the art will recognize that the described techniques can be used in other contexts as well, and that the specific implementations and embodiments described herein are merely exemplary.

In various embodiments, the techniques described herein are implemented in connection with SOPs that are characterized by a set of instructions for operators to follow when performing procedures, which may include routine, infrequent, or emergency procedures. To ensure correct execution of such instructions, SOPs are ideally organized as checklists, including a set of unambiguous actions listed in an optimal sequence. Conventionally, however, many SOPs do not share such characteristics. For example, they often do not follow a template; take for granted previous know-how of the asset and previous knowledge of tasks; and/or contain ambiguous steps.

One skilled in the art will recognize that the described techniques can be applied in connection with other applications and/or other types of processes. In addition, the particular hardware arrangements depicted and described herein are simplified examples, presented for illustrative purposes.

In some embodiments, one or more components, as shown and described below in connection with FIGS. 1 and 2, may be used to implement the system and method described herein. Such components may be implemented in a cloud computing-based client/server architecture, using, for example, Amazon Web Services, an on-demand cloud computing platform available from Amazon.com, Inc. of Seattle, Washington. For illustrative purposes, the system and method are described herein in the context of such an architecture. One skilled in the art will recognize, however, that the system and method can be implemented using other architectures, such as for example a stand-alone computing device rather than a client/server architecture.

Further, the functions and/or method steps set forth below may be carried out by software running on one or more of device 101, client device(s) 108, server 110, and/or other components. This software may optionally be multi-function software that is used to retrieve, store, manipulate, and/or otherwise use data stored in data storage devices such as data store 106, and/or to carry out one or more other functions.

For purposes of the description herein, a "user", such as user 100 referenced herein, is an individual, enterprise, or other group, which may optionally include one or more users. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device (s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user.

System Architecture

According to various embodiments, the system and method can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet. In at least one embodiment, the methods described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components well-known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data depicting SOPs, processes, parameters, state definitions, component descriptions, images, and/or the like. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. In particular, display screen 103 may display a user interface for capturing information from the field, characterizing components, specifying actions to be performed on components, viewing reports, and/or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
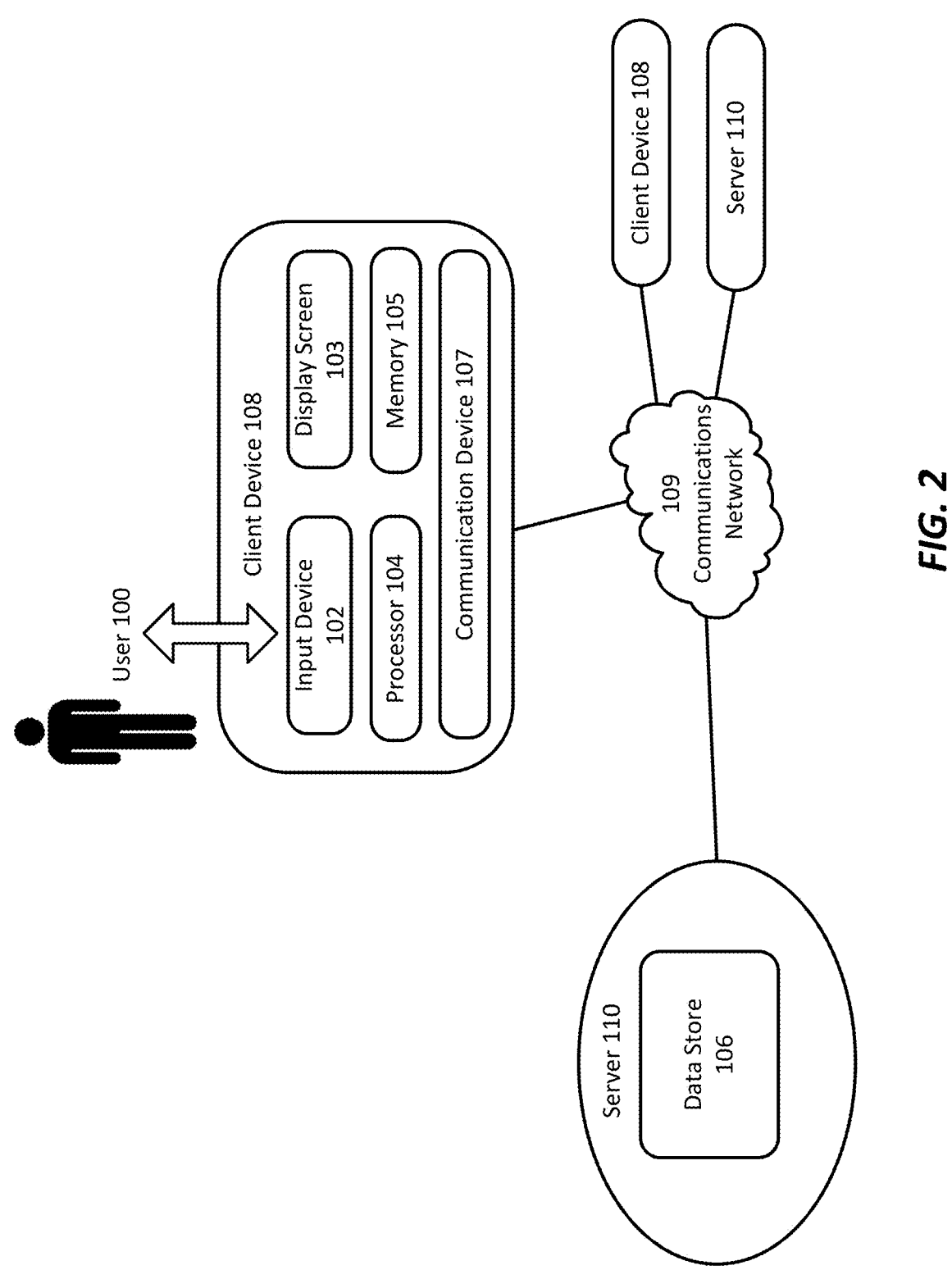
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As also set forth in FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data depicting SOPs, processes, parameters, state definitions, component descriptions, images, and/or the like; alternatively, such data can be stored elsewhere (such as at another server) and retrieved as needed.

In addition to or in the alternative to the foregoing, data may also be stored in a data store 106 present in client device 108. In some embodiments, such data may include elements distributed between server 110 and client device 108 and/or other computing devices in order to facilitate secure and/or effective communication between these computing devices.

As also set forth in FIG. 1, display screen 103 can be any element that displays information such as text and/or graphical elements, including a graphical user interface. Various user interface elements, dynamic controls, and/or the like may be used in connection with display screen 103.

As also set forth in FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.
Single State Machine (SSM)

Figure 3:
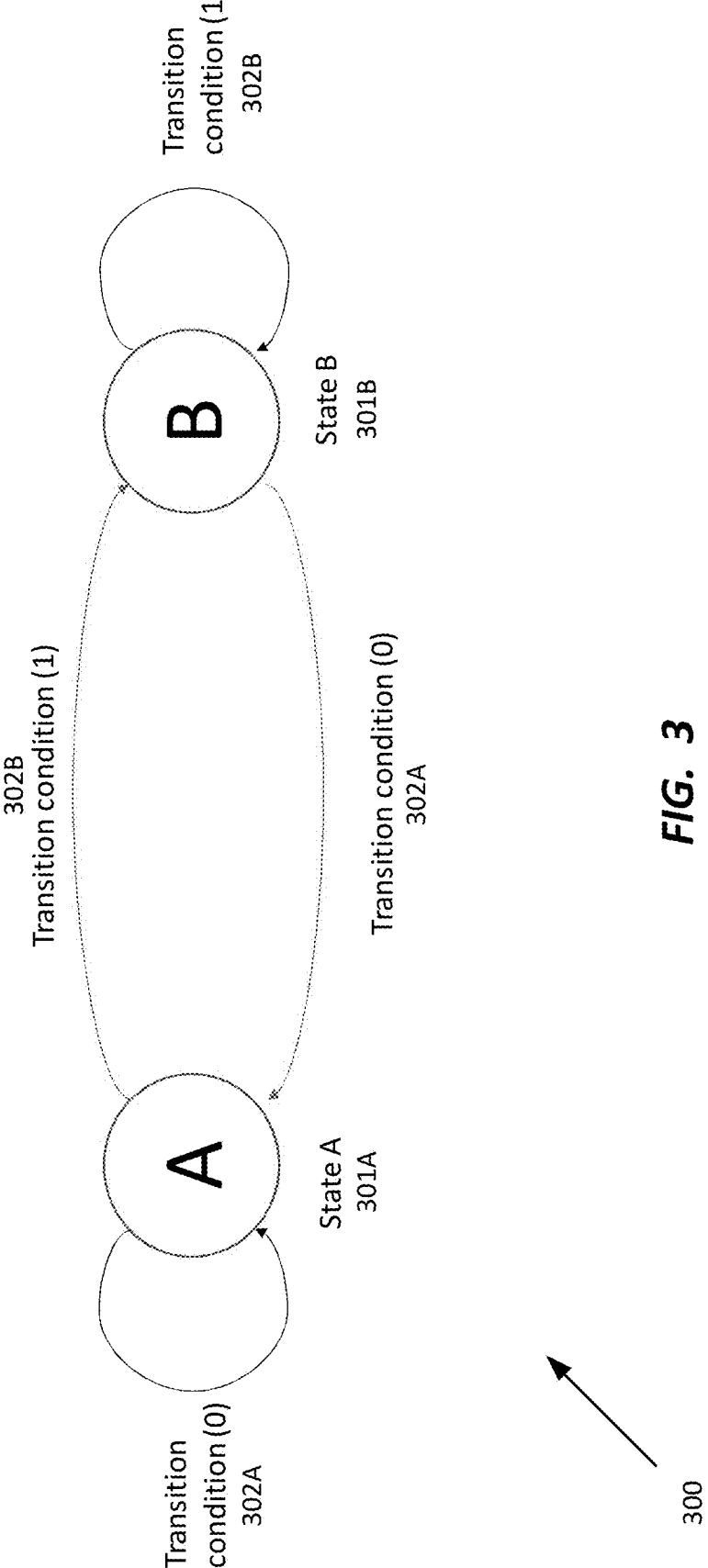
FIG. 3 is a block diagram depicting an example of a single state machine (SSM).

Referring now to FIG. 3, there is shown an example of a single state machine (SSM) 300. As depicted, example SSM 300 is a minimum unit of a finitestate machine (FSM), in that it is a system that can only be in one state at any given time (in this case, State A 301A or State B 301B). State machine 300 changes from one known state 301 to another predictable state 301 in response to an input; such input is referred to as a transition condition 302. In the depicted example, two transition conditions 302 are shown: transition condition 302A, denoted by a value of 0, causes SSM 300 to move to (or remain in) state A 301A, while transition condition 302B, denoted by a value of 1, causes SSM 300 to move to (or remain in) state B 301B. In the example of FIG. 3, the input to SSM 300 is an action, such as one performed on a piece of equipment or the like.
Standard Operating Procedure (SOP)

Figure 4:
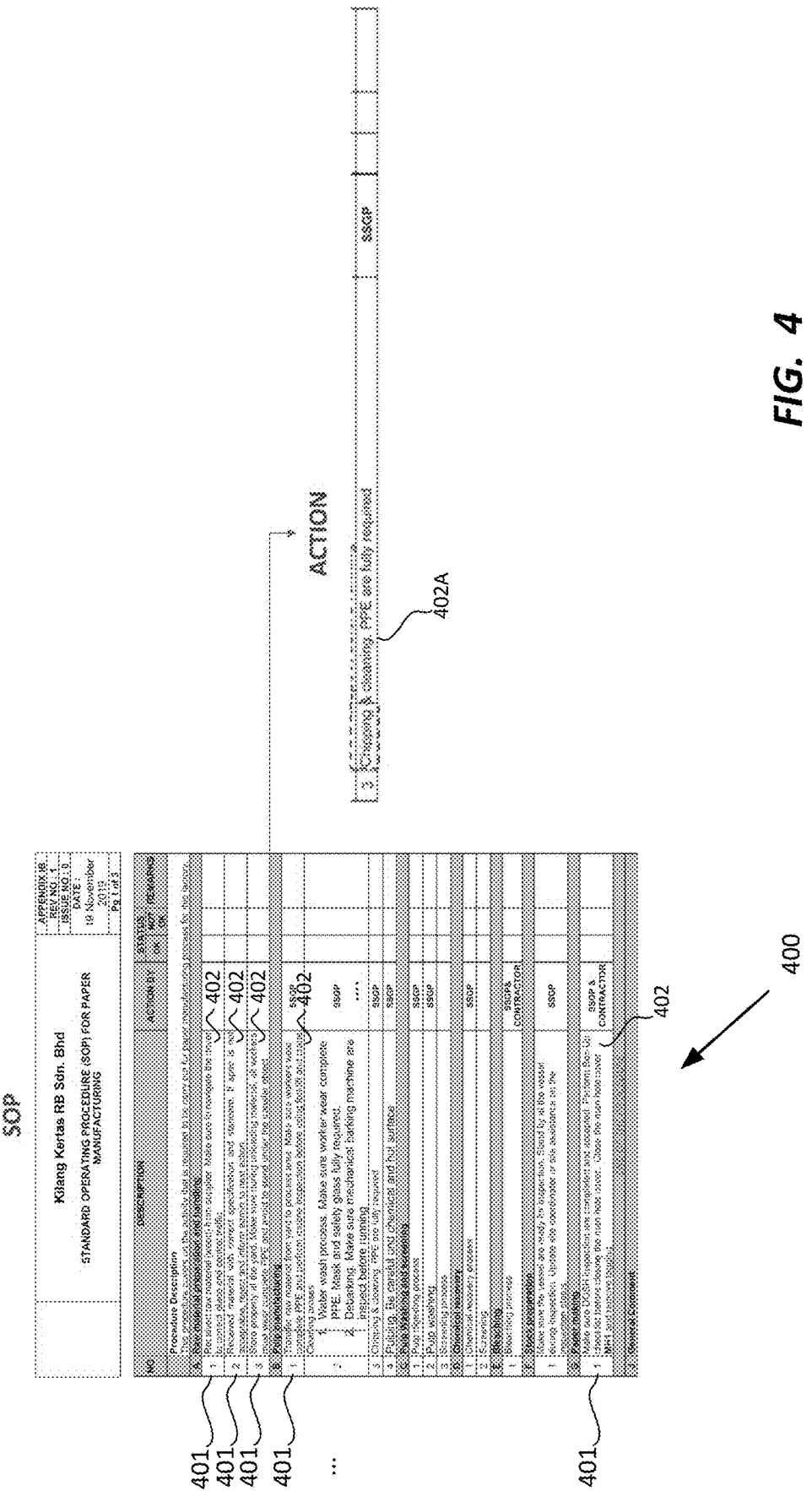
FIG. 4 depicts an example of an SOP as may be used in a process industry.

Referring now to FIG. 4, there is shown an example of a standard operating procedure (SOP) 400 as may be used in the process industry. As depicted in the example of FIG. 4, SOP 400 is a set of instructions 401 for executing a particular task. Typically, each instruction 401 sets forth one or more action(s) 402 to be performed, such as, for example, action 402A which is called out in FIG. 4.

If followed correctly, the response of the system to performance of actions 402 specified by instructions 401 in SOP 400 is predictable. However, as mentioned above, conventionally SOPs 400 are often written without a standard template, so that the level of detail and the accuracy of explanations are variable.

SOPs 400 are often written by subject matter experts and/or process engineers. Both rely heavily on theoretical process technology and resulting piping and instrumentation diagrams (P&IDs); these are detailed diagrams that show schematically the piping and the process equipment together with the instrumentation and control devices.

In general, SOPs 400 can function as an instruction manual, describing various interactions with process equipment, instrumentation, and control devices to perform a particular task.

As shown in the example of FIG. 4, several challenges can arise in generating an SOP 400.

Firstly, instructions 401 are usually written following a logical engineering sequence, rather than the most efficient sequence for the operator executing the task. For example, a SOP 400 may specify that three pipes need to be closed (e.g., by specifying instructions 401 to Close X, Y and Z because the three pipes are of the same type, rather than by specifying a sequence that is more efficient for an operator executing the task by reducing walking distance). In addition to being suboptimally efficient, such instructions 401 can often contain ambiguities and can compromise safety.

In various embodiments, the techniques described herein address such issues by emphasizing efficiency, safety, and process dynamics, so as to generate instructions that eliminate ambiguity and ensure standard, repeatable, and streamlined execution.

Another issue that may arise with SOPs 400 is that instructions 401 may specify actions by reference to families of elements, e.g. "close all the drains in the pipe", without providing adequate information as to the actual quantity or exact locations of the elements (e.g., drains).

A third issue is that instructions 401 often take for granted knowledge about the system. For example, an instruction 401 may specify that a compressor be shut down, making an assumption that an operator has the proficiency and expertise to understand and perform the specified action 402; however, some operators may lack such abilities.

A fourth issue is that many SOPs 400 do not adequately take into account the actual real-world context ("as-built situation") of the equipment to be acted upon. For example, such real-world context may reflect changes that have taken place as a result of maintenance and/or repair activities. However, SOP 400 may incorrectly assume that the equipment remains as described in its original P&ID and may not have been updated after such maintenance and/or repair activities. In at least one embodiment, the described techniques provide instructions that reflect the actual physical layout and configuration of the components, rather than their original design, so that the instructions are consonant with "walking in the field"

Such challenges, among others, often produce SOPs 400 that are hard to follow, ambiguous, and even outdated. As a result, SOPs 400 are often not followed correctly. In some cases, only senior operators can be assigned to execute the most critical procedures because they rely on their experience and knowledge of the equipment rather than on written SOPs 400. Even bringing such expertise to operations, such senior operators may still make errors due to inadequacies and ambiguities in generated SOPs 400.

Figure 5:
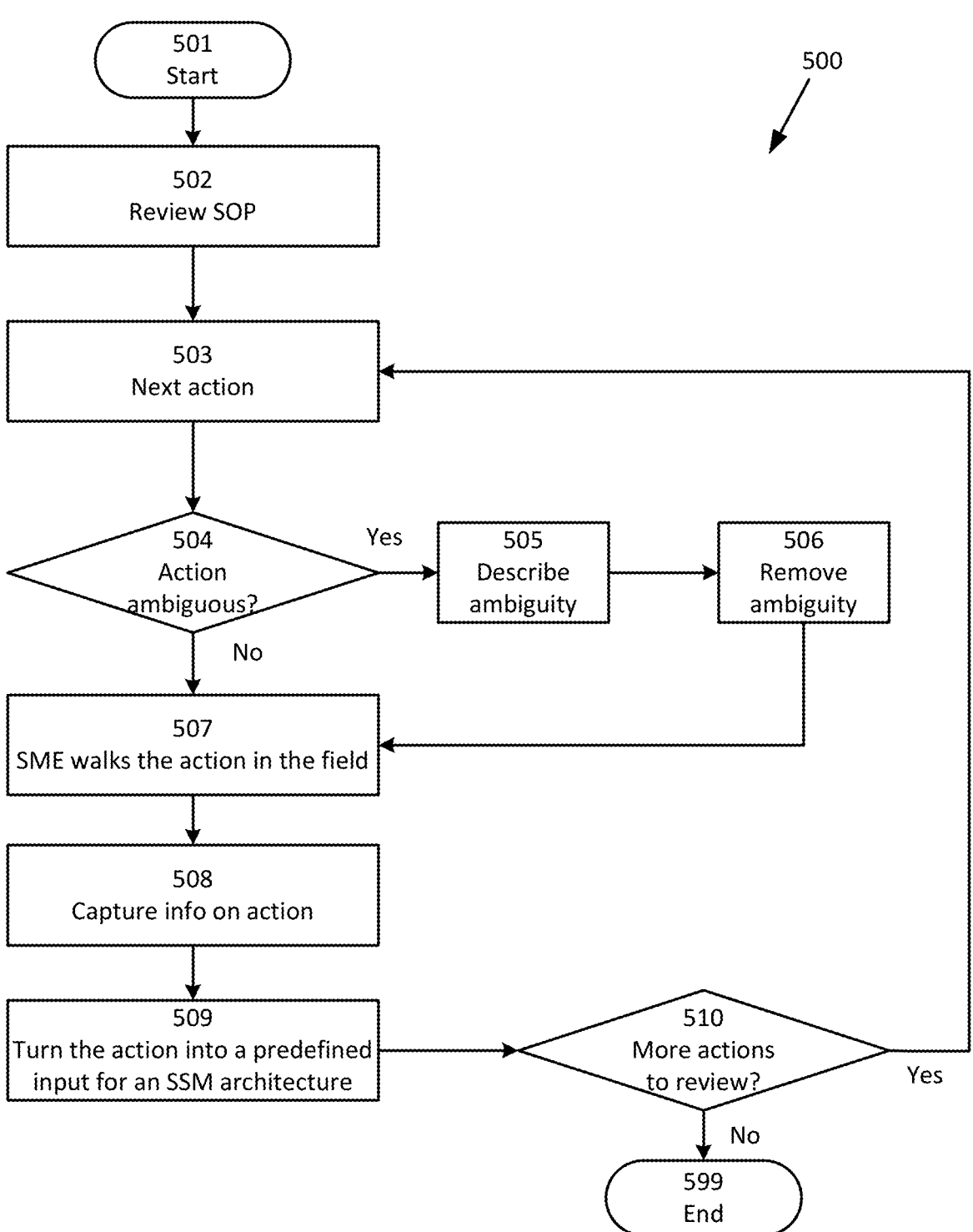
FIG. 5 is a flow diagram depicting a method for converting an SOP to an SSM while ensuring that there are no inconsistencies or ambiguities, according to one embodiment.

Referring now to FIG. 5, there is shown a flow diagram depicting a method 500 for converting an SOP 400 to an SSM 300 while ensuring that there are no inconsistencies or ambiguities, according to one embodiment. Method 500 helps ensure that actual real-world context is taken into account, so as to ensure that SOP 400 and SSM 300 are clear and up-to-date.

In at least one embodiment, method 500 may be performed by software running on a computing architecture as described above in connection with FIG. 1 or FIG. 2. For example, the steps of method 500 may be performed by processor 104 under the direction of software. One skilled in the art will recognize, however, that the steps of method 500 may be performed by any suitable electronic device.

Method 500 begins 501 by reviewing 502 SOP 400 to analyze each instruction 401 in SOP 400 and identify action(s) 402 specified by the instruction 401. In performing method 500, each action 402 specified by an instruction 401 in SOP 400 is considered one-by-one, as follows.

The next (or first) action 402 identified in an instruction 401 of SOP 400 is considered 503. A determination is made 504 as to whether instruction 401 specifies action 402 in a non-ambiguous manner. If action 402 is specified in a non-ambiguous manner, the method proceeds with step 507, as described below. If action 402 is specified in an ambiguous manner, a description of the ambiguity is obtained 505, and the ambiguity is removed 506. Any of steps 504, 505, and/or 506 can be performed manually or automatically, as described in more detail below. The method then proceeds to step 507.

In at least one embodiment, a subject matter expert (SME) "walks" 507 action 402, meaning that he or she goes into the field (i.e., the environment in which action 402 is to be performed) to capture 508 information about action 402. Such information may be captured, for example by viewing the equipment to be used in connection with action 402. Based on the information captured in step 508, a predefined input for SSM 300 is generated 509 in the form of an instruction for action 402. In at least one embodiment, step 509 may involve identifying the component by name (for example, "drain valve 123") and describing the action to perform (for example, "open"). Field information captured in step 508 may be used to document the transition condition and the final state after action 402 has been performed.

In step 510, a determination is made as to whether SOP 400 contains more actions 402 to review. If so, the method returns to step 503. Otherwise, the method ends 599.

Further details are provided below.

Figure 6:
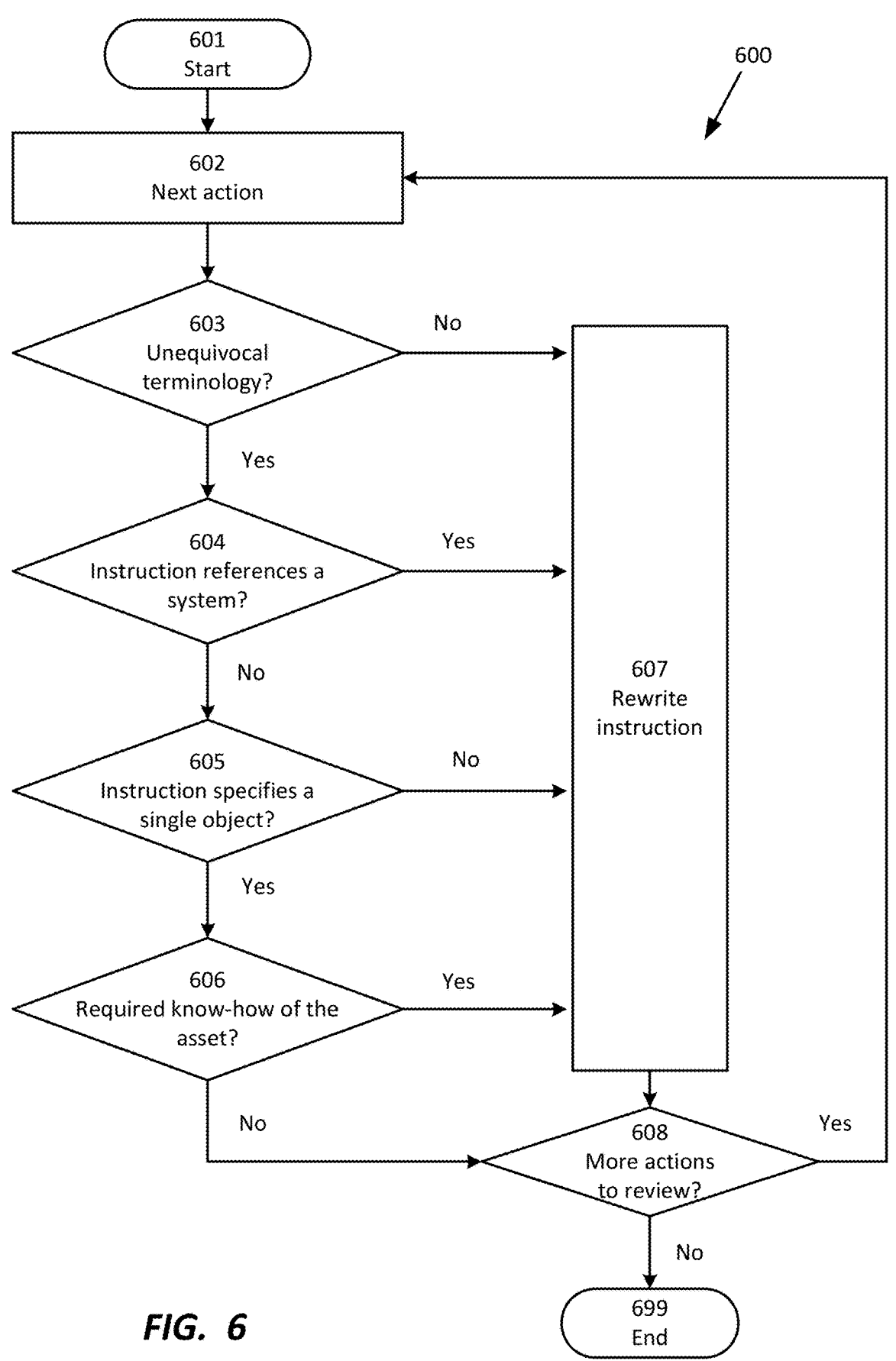
FIG. 6 is a flow diagram depicting additional details for checking for and resolving ambiguities, according to one embodiment.

Referring now to FIG. 6, there is shown a flow diagram depicting additional details for steps 504, 505, and/or 506 of FIG. 5, wherein ambiguities in instructions 401 are detected and resolved.

As with method 500 depicted in FIG. 5, method 600 of FIG. 6 involves reviewing SOP 400 to analyze each instruction 401 in SOP 400 and identify action(s) 402 specified by the instruction 401. In performing the method, each action 402 specified by an instruction 401 in SOP 400 is considered one-by-one, as follows.

In general, an ambiguous instruction 401 is one that can be understood or executed in different ways, which may lead to confusion and/or misinterpretation.

In at least one embodiment, method 600 validates the nonambiguity of each instruction 401 in SOP 400 by checking that it specifies and describes a particular action 402 the operator is to execute in the field, without any doubt or lack of clarity. This can include checking syntax and clarity, considering two key elements: the verb (representing the action 402 the operator is to perform) and the noun (representing the name of the component with which the operator is to interact).

The method begins 601. The next (or first) action 402 identified in an instruction 401 of SOP 400 is considered 602. Determination 504 as to whether instruction 401 specifies action 402 in a non-ambiguous manner is performed via steps 603, 604, 605, and 606 as follows:

Step 603 involves checking whether the terminology used in instruction 401 specifying action 402 is unequivocal. This can include checking that the syntax of instruction 401 includes an unambiguous verb and an unambiguous object, where the verb specifies action 402 to be performed, and the object specifies the element on which action 402 is to be performed. An example of a properly formatted instruction 401 is "Close valve X". If the terminology is not unequivocal, the method proceeds to rewrite 607 instruction 401.

Step 604 involves checking whether action 402 specified by instruction 401 references a system as opposed to a single component. If a system is referenced, the specific objects on which the action is to be performed may not be clear. An example of an action 402 that references a system (as opposed to an individual object) is "Close pump" (as opposed to "Close valve"). If ambiguity exists because the action 402 specified by instruction

401 references a system, the method proceeds to rewrite 607 instruction 401.

Step 605 involves checking whether action 402 specified by instruction 401 specifies a single object rather than an indefinite number of objects. An example of an action 402 that has ambiguity because it refers to an indefinite number of objects is "Close all valves", because the number of valves to be acted upon is not clear. If ambiguity exists because action 402 specified by instruction 401 references an indefinite number of objects, the method proceeds to rewrite 607 instruction 401.

Step 606 involves checking whether performing action 402 requires any previous operational know-how. If ambiguity exists because action 402 specified by instruction 401 requires previous know-how, the method proceeds to rewrite 607 instruction 401.

A determination is made 608 as to whether there are more actions 402 to review. If so, the method returns to step 602. Otherwise, the method ends 699.

In at least one embodiment, the steps of FIG. 6 may be performed by an automated system. For example, an automated system may detect ambiguities and may automatically rewrite instructions 401 that are the source of such ambiguities. Such rewritten instructions 401 can then be presented for approval by a human. In an alternative embodiment, detection of ambiguities and/or rewriting of ambiguous instructions 401 can be performed by a human.

Once all actions 402 have been reviewed, the method ends 699.

Referring now to FIG. 7, there is shown a table 700 depicting examples of methods for rewriting instructions 401 for an SOP 400. Table 700 shows a number of different types 701 of ambiguity, their causes 702, and the goal 703. Also shown for each type of ambiguity is an example 704 depicting how such an ambiguity can be resolved. One skilled in the art will recognize that the items presented in table 700 are merely exemplary.

Figure 8:
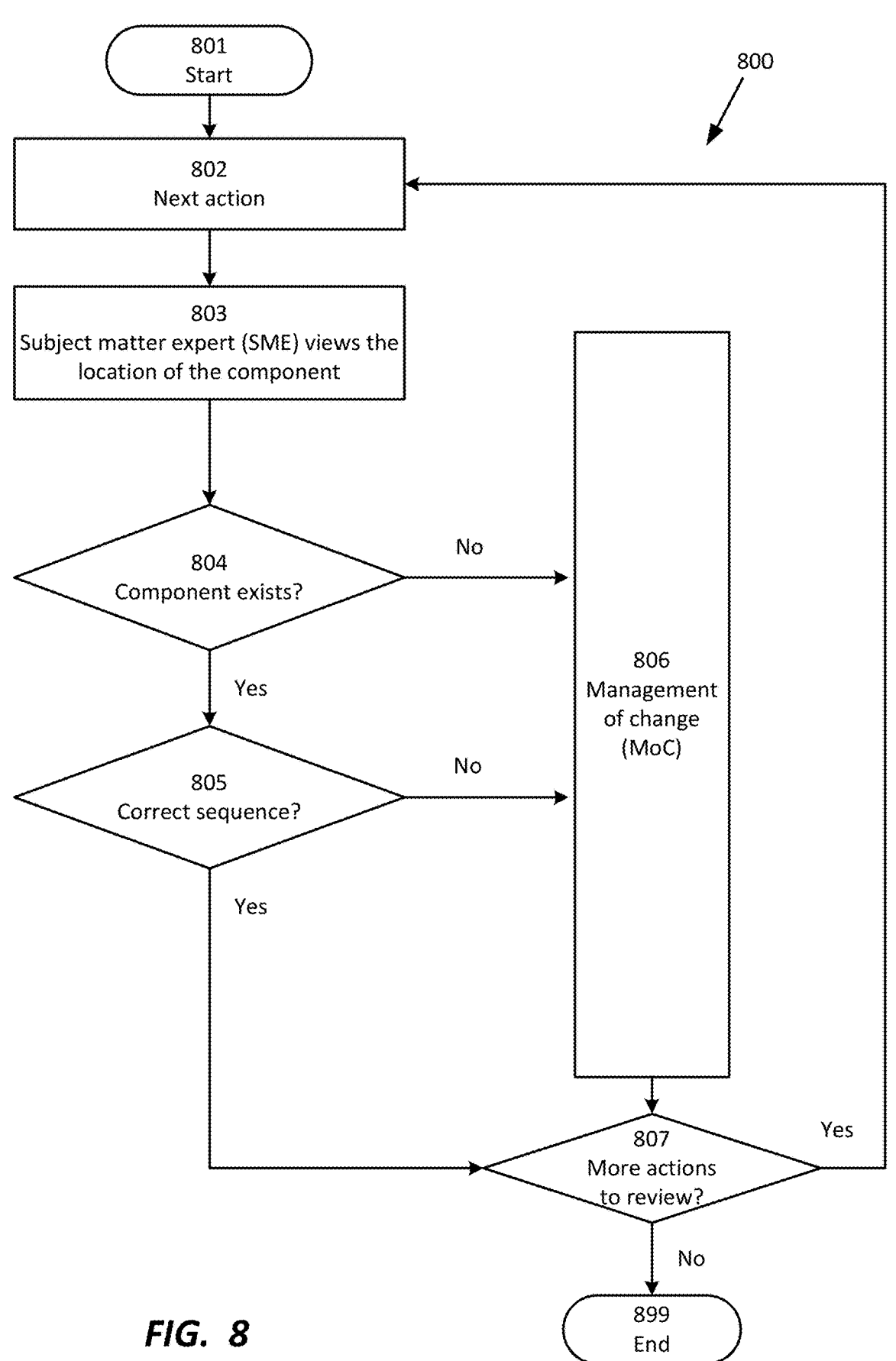
FIG. 8 is a flow diagram depicting a method by which a subject matter expert (SME) can investigate the locations of components to determine whether ambiguity exists, according to one embodiment.

Referring now to FIG. 8, there is shown a flow diagram depicting a method 800 by which a subject matter expert (SME) can investigate the locations of components to determine whether ambiguity exists. The steps of method 800 can be performed by a human or by an automated component. It is assumed that, before the steps of method 800 are performed, SOP 400 has already been broken down into a set of actions 402.

Method 800 begins 801. In performing method 800, each action 402 specified by an instruction 401 in SOP 400 is considered one-by-one, as follows.

The next (or first) action 402 identified in an instruction 401 of SOP 400 is considered 802. The SME views 803 to the location of the component specified in action 402, either by visiting it physically or viewing it remotely, e.g. by viewing it on a camera. The SME determines 804 if the component exists. If so, the SME determines 805 whether action 402 and its component are in the correct sequence. If the component does not exist, or is not properly defined/specified in SOP 400, or if the action/component is not in the correct sequence, a management of change (MoC) process 806 is triggered, in which appropriate personnel (such as supervisors, engineering staff, and/or the like) are called upon to rewrite SOP 400 and obtain approval from management. Alternatively, the rewriting process can be automated using an updated piping and instrumentation diagram (P&ID) of the process, and each of the steps to perform can be sequenced automatically.

Figure 9:
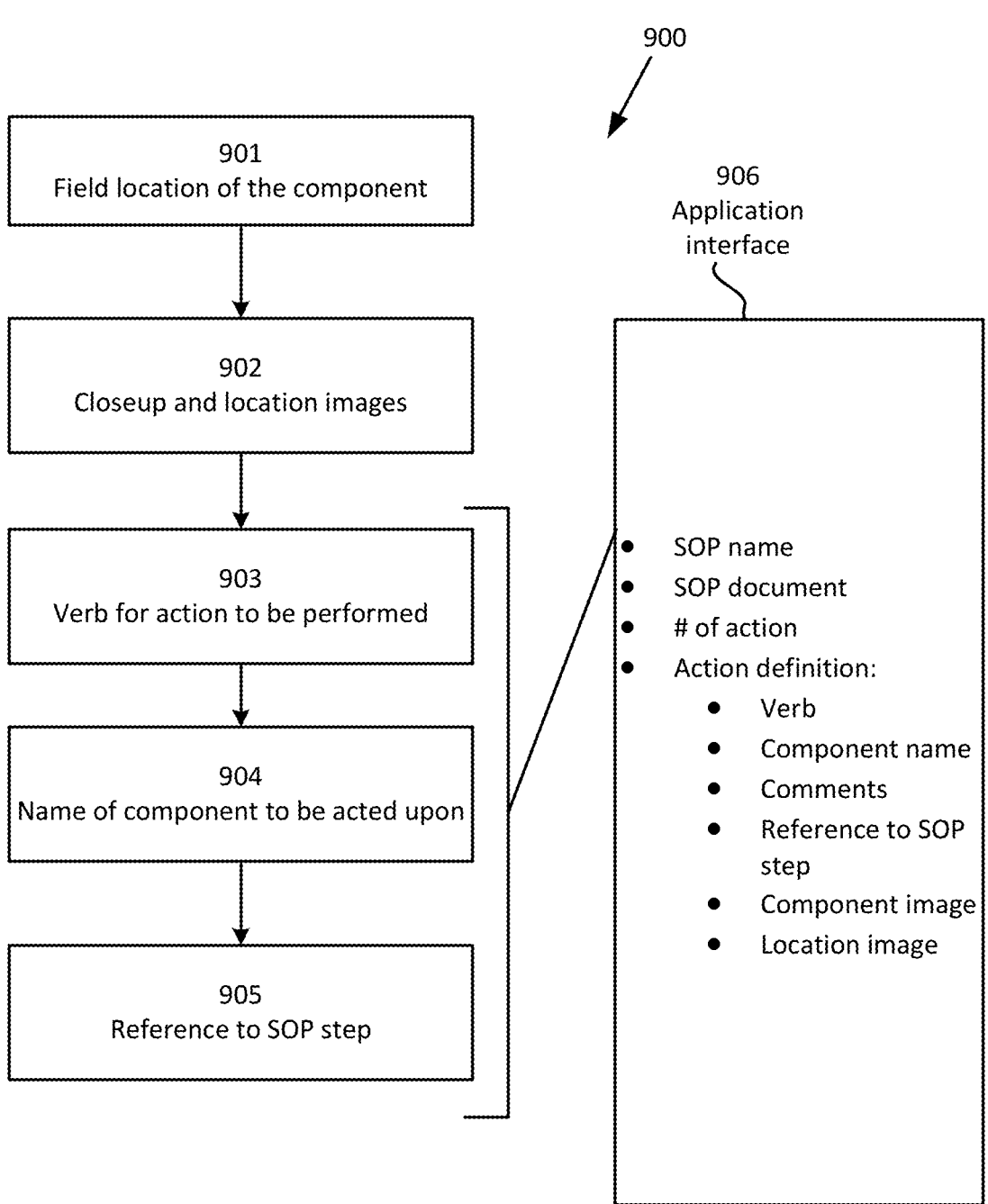
FIG. 9 is a block diagram depicting a methodology for capturing information in the field to generate a non-ambiguous instruction, or to rewrite an ambiguous instruction as a non-ambiguous one, according to one embodiment.

In step 807, a determination is made as to whether SOP 400 contains more actions 402 to review. If so, method 800 returns to step 802. Otherwise, method 800 ends 899, Referring now to FIG. 9, there is shown a block diagram depicting a methodology 900 for capturing information in the field to generate a nonambiguous instruction 401, or to rewrite an ambiguous instruction 401 as a nonambiguous one. The process starts by capturing various items of information, including field location 901 of the component to be acted upon, at least one image 902 of the component in its surroundings, captured, for example with a digital camera or other digital imaging device. In at least one embodiment, a close-up image of the component itself (such as a photograph of the component) can be captured, along with an image of its surroundings or environment (such as a photograph of the location). Taken together, these images can allow the component to be located within an asset or system. Additional data can also be captured, such as the GPS location of the component and/or other information, so as to allow proper identification of the component.

Based on the captured image(s), an appropriate verb 903 is chosen to specify the action to be performed, along with a suitable name 904 for the component being acted upon. An appropriate reference 905 to the SOP step can be included. The result is a non-ambiguous action that defines a transition between states of a single state machine, as shown in the example of FIG. 7. An application interface 906 can be displayed on display screen 103 to present the action, component, image, and/or any other relevant information, which can be presented in the context of an SOP.

Figure 10A:
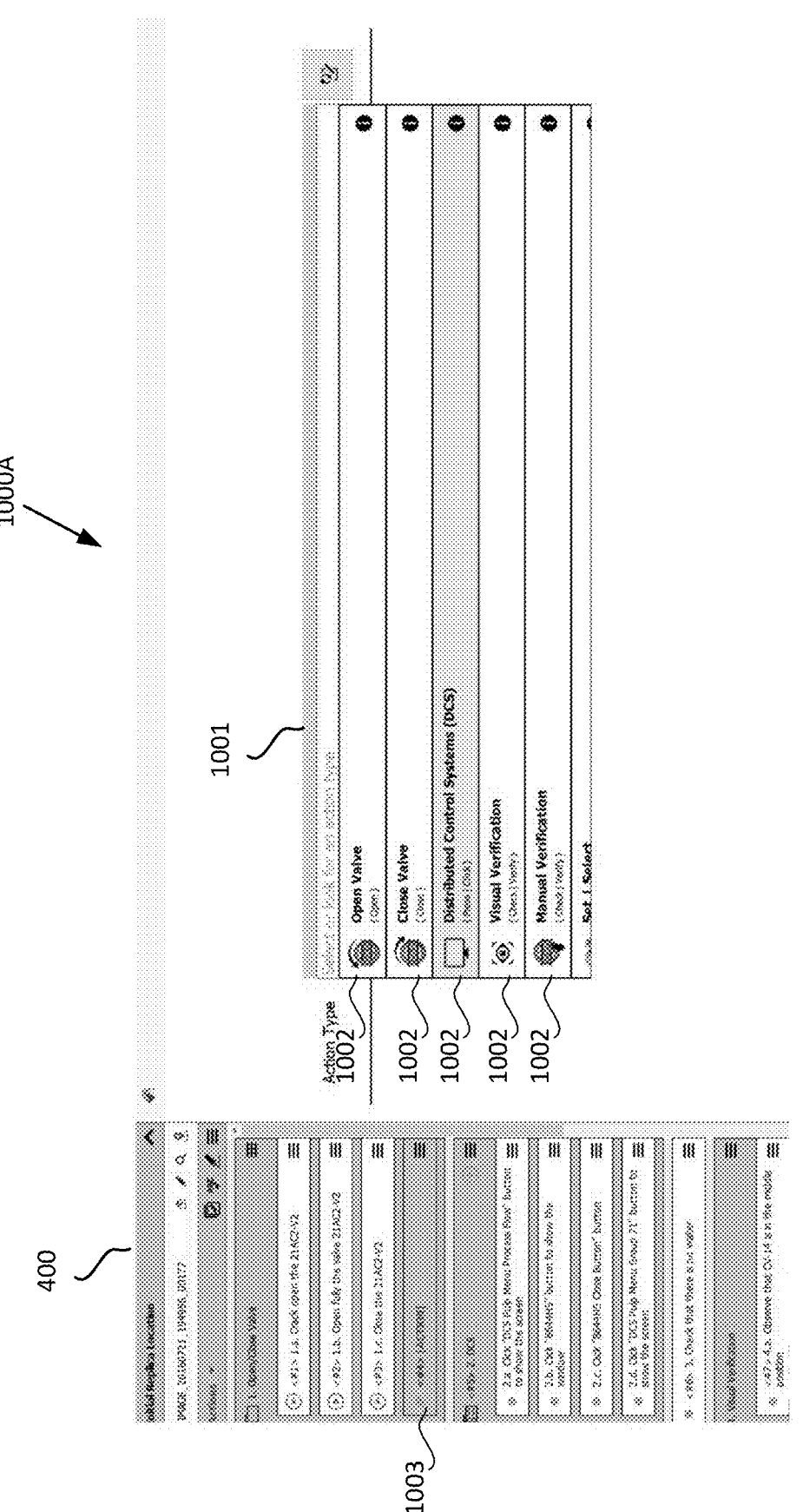
FIGS. 10A and 10B are screen shots depicting an example of an application interface for executing the methodology described herein, according to one embodiment.
Figure 10B:
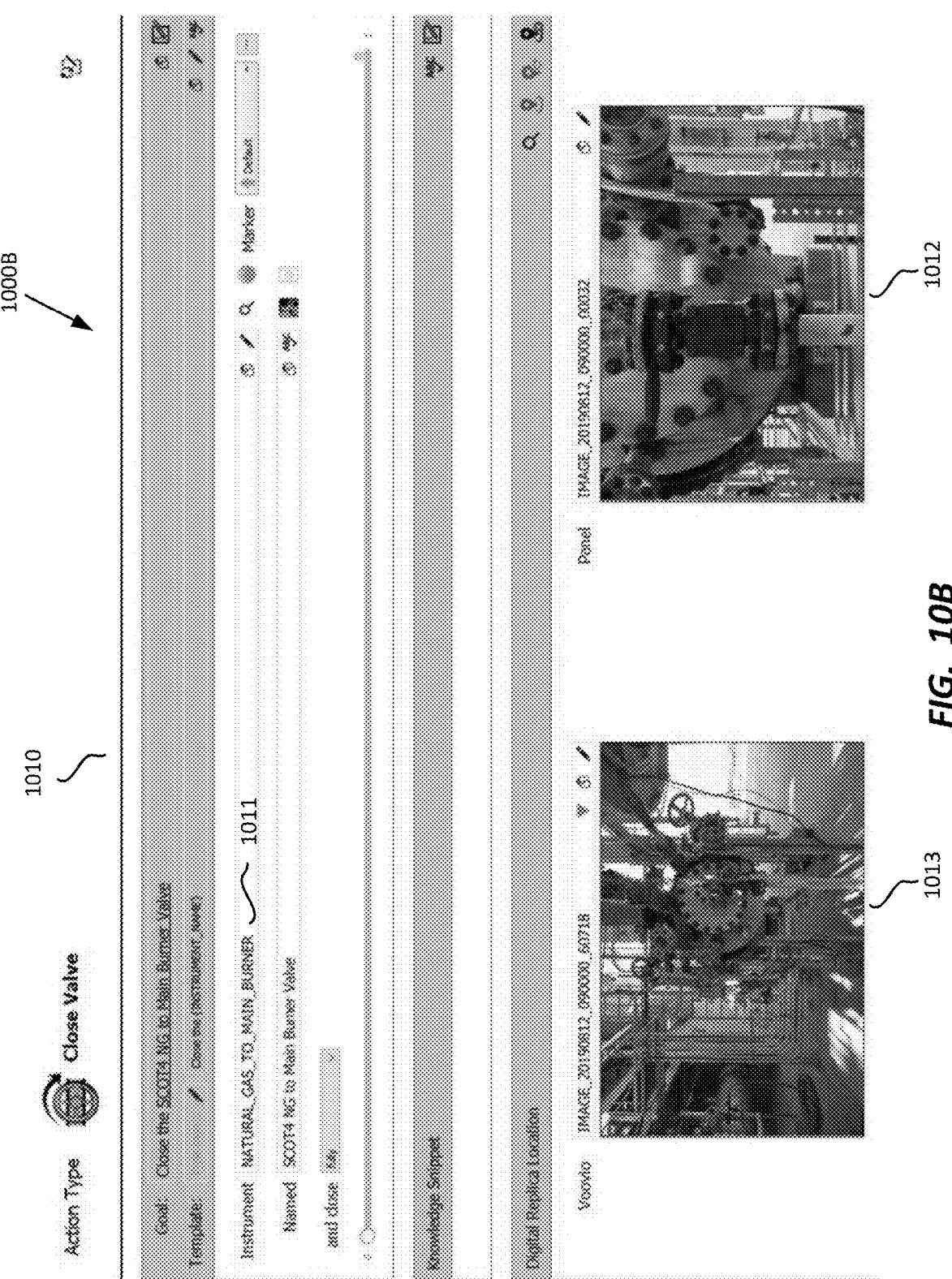

Referring now to FIGS. 10A and 10B, there are shown example application interface screen shots 1000A and 1000B for executing the methodology described herein, according to one embodiment. Application interface screen shots 1000A and 1000B depict examples of an interface for specifying instructions for an action, along with the sequence in which the instructions are to be performed. As described in more detail below, the depicted examples provide mechanisms by which user 100 can: 1) select a particular action (verb) from a list of predefined actions; 2) select a component of the asset on which the action is to be executed; and 3) define the parameters of the interaction.

In screen shot 1000A, user 100 selects an action definition (verb) from menu 1001 containing a number of predefined templates (action types) 1002, to be added to slot 1003 of SOP 400.

In at least one embodiment, selecting an action definition (verb) from menu 1001 containing a number of predefined templates (action types) 1002 causes window 1010 to open, as shown in screen shot 1000B, where user 100 can specify additional details, upload images, and/or the like. For example, user 100 can enter, in window 1010, a complete name 1011 of the component, and can add, upload, select, or edit a close-up image 1012 and/or location image 1013.

Figure 11:
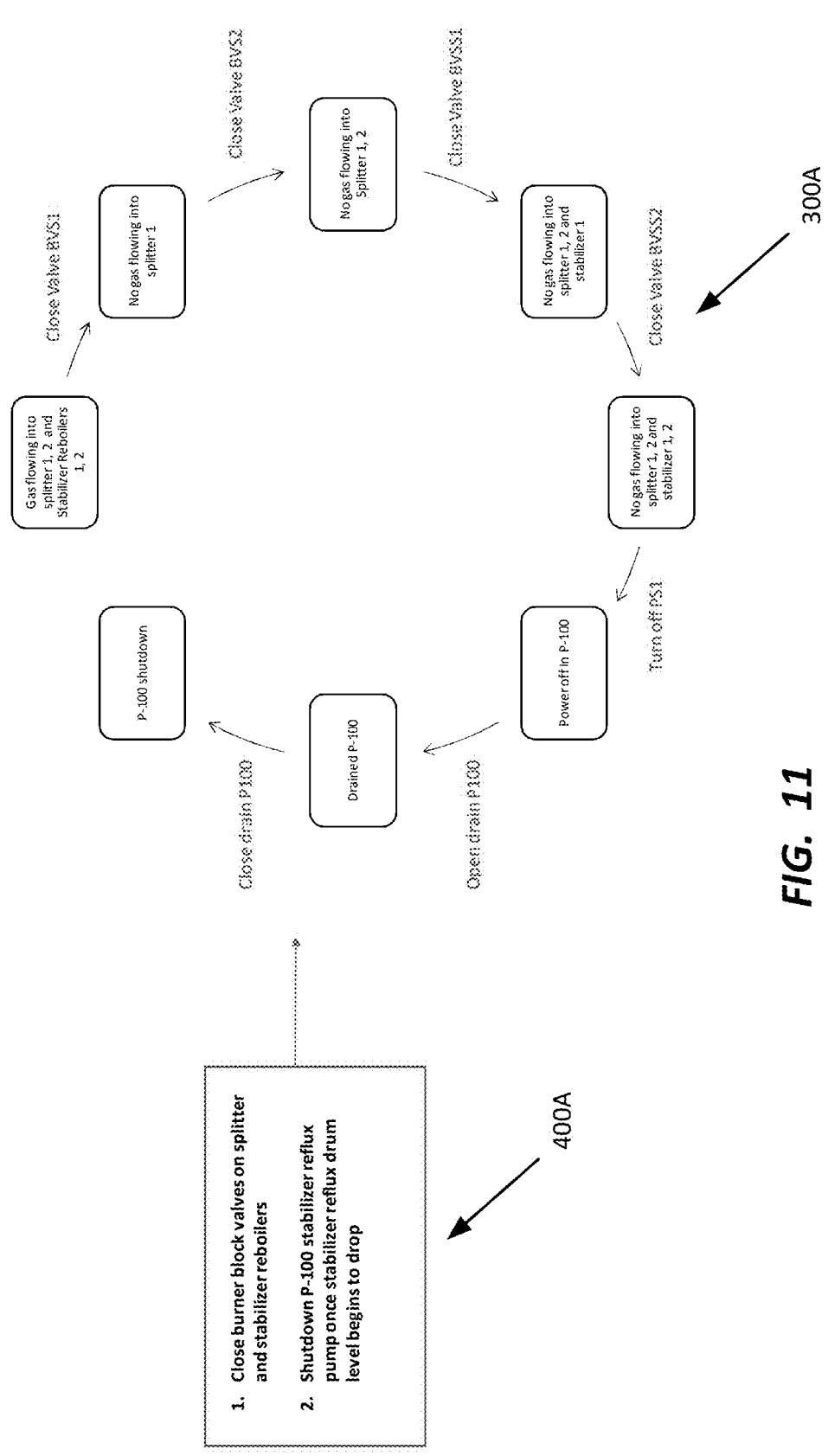
FIG. 11 is a block diagram depicting an example of a comparison between an SOP and an SSM.

Referring now to FIG. 11, there is shown an example of a comparison between an SOP 400A and an SSM 300A. In at least one embodiment, the methodology described herein allows translation from such an SOP 400A to SSM 300A.

In the depicted example, SOP 400A includes instructions for two actions. SSM 300A provides an example of how these two actions can translate into seven single state machines.

Referring now to FIGS. 12A through 12D, there are shown a series of drawings illustrating an example of a user interaction with the interface of the described system, according to one embodiment.

Figure 12A:
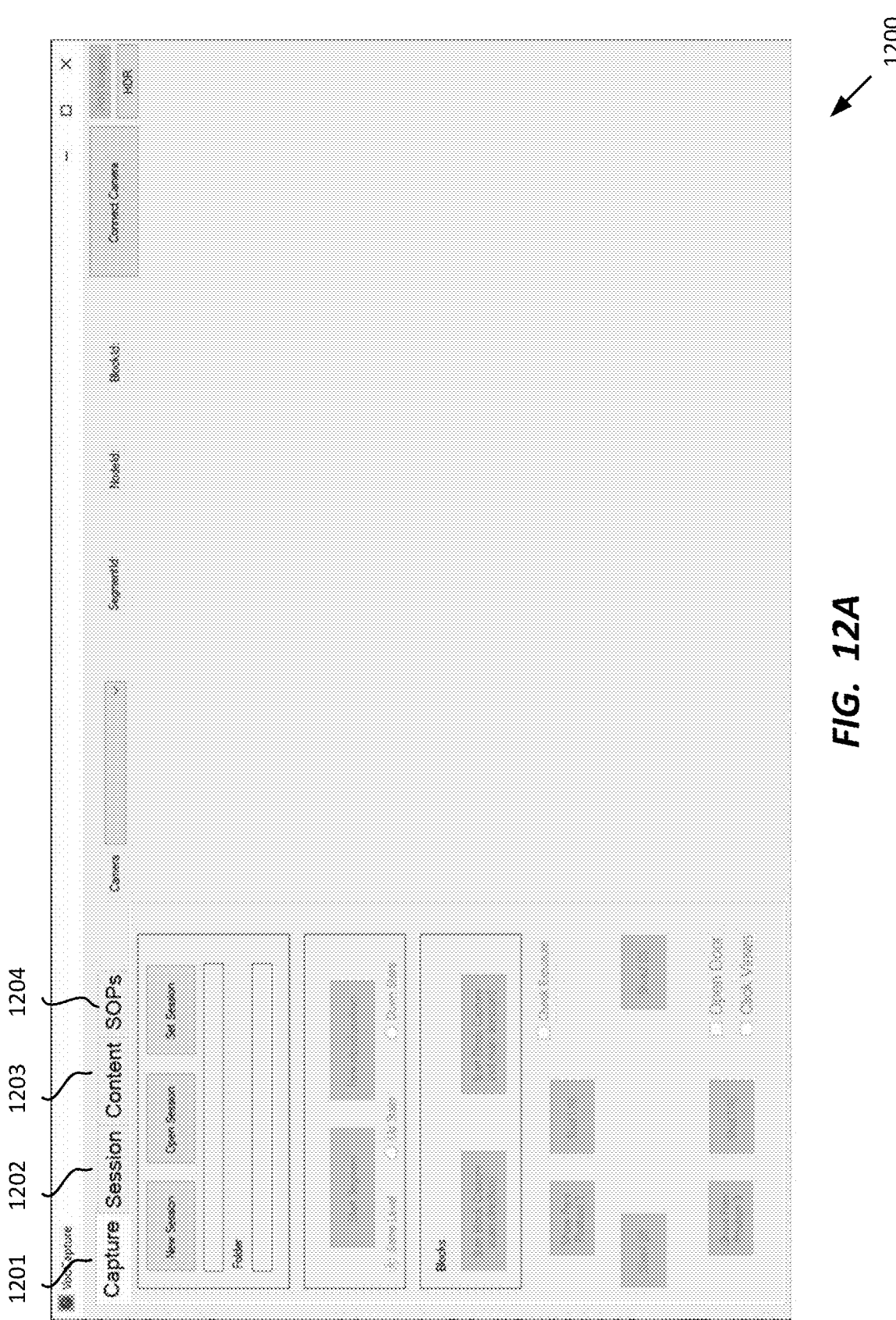

FIG. 12A depicts an example of a user interface screen 1200 for capturing information from the field. Tab 1201 provides access to fields for capturing images and component location information for a particular segment, wherein a segment is a working unit (such as, for example, the smallest practical working unit) for capturing information about part of a piece of equipment or asset. In at least one embodiment, some number of images are captured for a particular distance traversed (or "walked"), and such images can be captured in various directions. For example, in one embodiment, every two steps traversed, the system captures four photos with a rotation of 90 degrees each; such an approach yields the equivalent of a 360-degree panoramic image.

Tab 1202 provides access to fields for collecting session information. Tab 1203 provides access to fields for collecting content. Tab 1204 provides access to fields for collecting information about SOPs. In at least one embodiment, a main view is shown, including controls for accessing a camera, connecting and/or disconnecting to the camera, and viewing the most recent image captured via the camera.

Figure 12B:
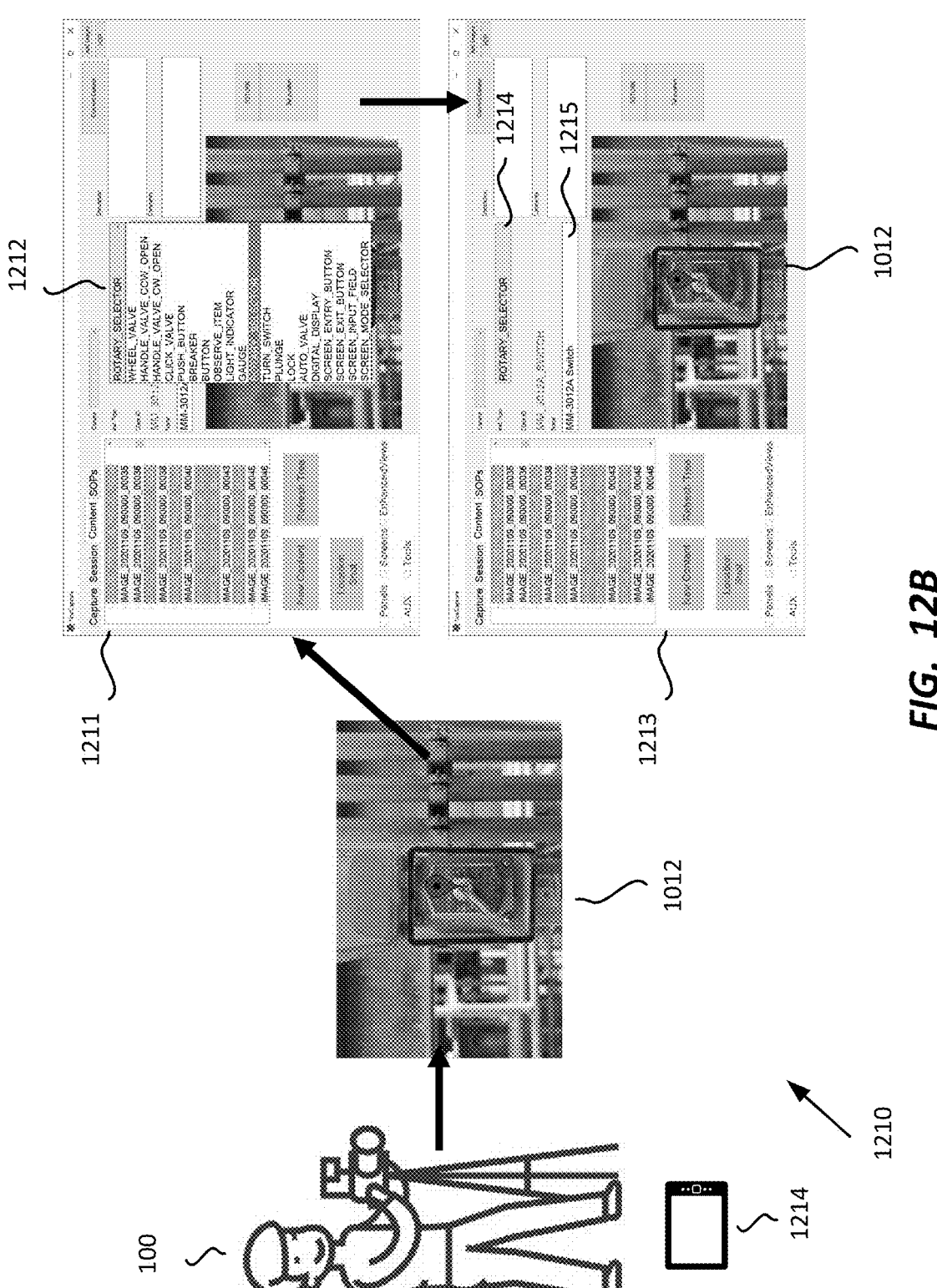

FIG. 12B depicts a first step 1210 in which user 100 captures one or more image(s) 1012 of the component via image capture device 1214, which may be a camera, smartphone, tablet, or the like. User 100 interacts with screen 1211 to specify the item type from menu 1212, and then interacts with screen 1213 to provide a name for the component in field 1215. The specified item type appears in field 1214 in screen 1213. Captured image(s) 1012 are also shown on screen 1213. In this manner, captured image(s) 1012 are linked to a logic template to characterize the nature of the component, for example to specify its type and any further pertinent details.

Figure 12C:
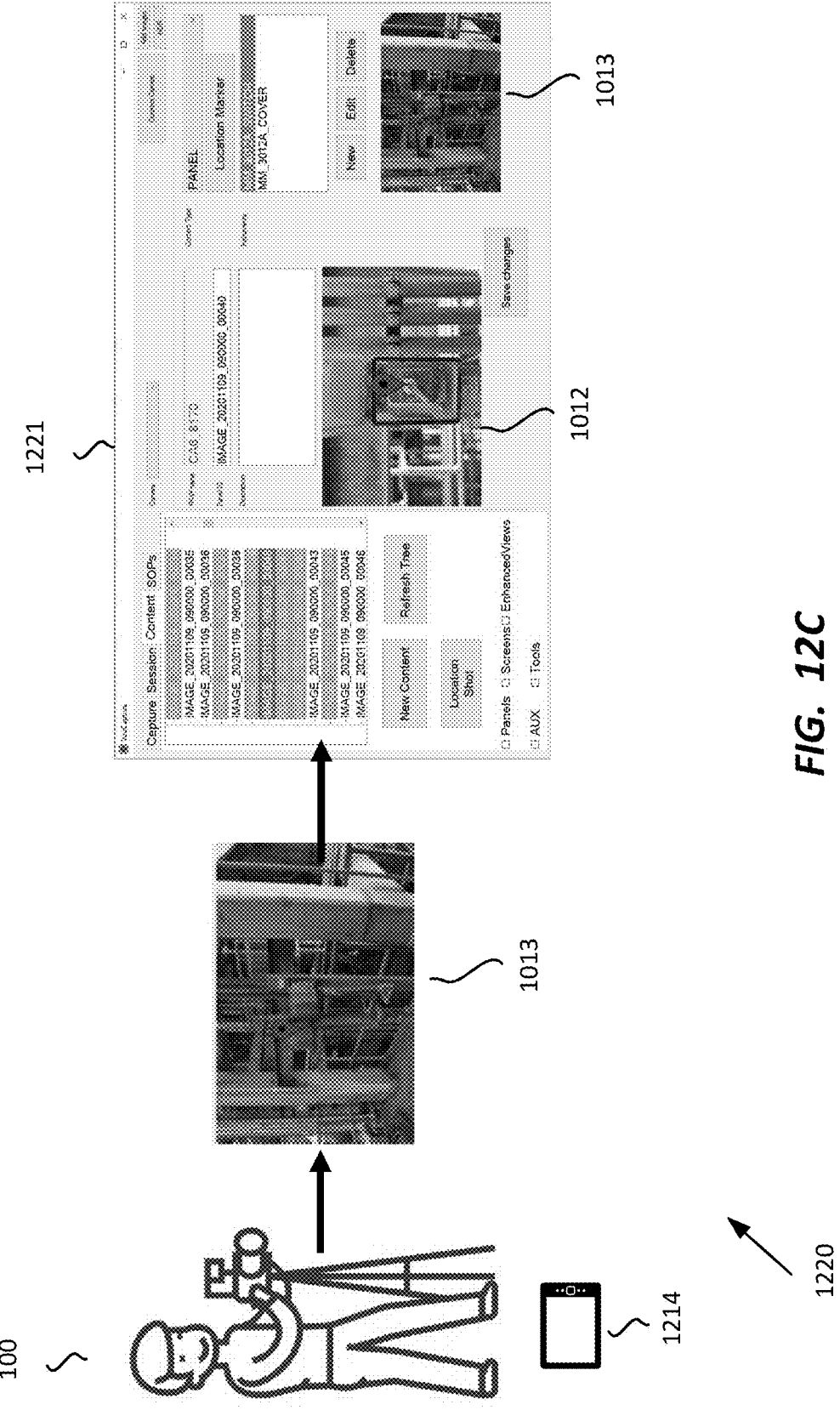

FIG. 12C depicts a second step 1220 in which user 100 captures one or more image(s) 1013 of the location, surroundings, and/or environment of the component, via image capture device 1214. User 100 interacts with screen 1221 to link image(s) 1013 to previously captured component image(s) 1012, so as to provide greater clarity as to the location of the component.

FIG. 12D depicts a third step in which user 100 can specify action(s) to be performed on the components. In screen shot 1230, user 100 can select among a set of predefined action types (or templates) in menu 1231. In at least one embodiment, such action types represent templates of predefined simulatable actions. Such templates reflect the real-life behavior of the actual instruments, equipment, or assets being manipulated.

In screen shot 1232, user 100 can select, from menu 1233, whether the selected action needs to be modified, added, skipped, removed, reordered, or the like. Menu 1233 thus reflects the relative accuracy of the written action with respect to reality, as follows:

"AsProcedure" means the action is performed as written;
"Added" means the instruction specifying the action was not written in SOP 400 and is being added;
"Modified" means the instruction specifying the action has been updated with respect to what is written;
"Skipped" means the action is to be skipped;
"Removed" means the instruction specifying the action is to be removed from SOP 400;
"Reordered" means the actions are to be reordered in SOP 400.

In screen shot 1234, user 100 can provide any additional data needed for the action, via the various fields, including notes field 1235.

The various remaining fields in FIGS. 12A through 12D provide additional details of the equipment, instrument, or asset on which the action is to be performed.

Checking and Resolving Ambiguities

In at least one embodiment, ambiguities can be checked and resolved in an automated fashion, for example by converting unstructured text into structured text, and then applying a neural network. Such an approach can take advantage of:

Structured text used in SOPs;

Latin alphabet; and

Available data for training neural network models.

Figure 13:
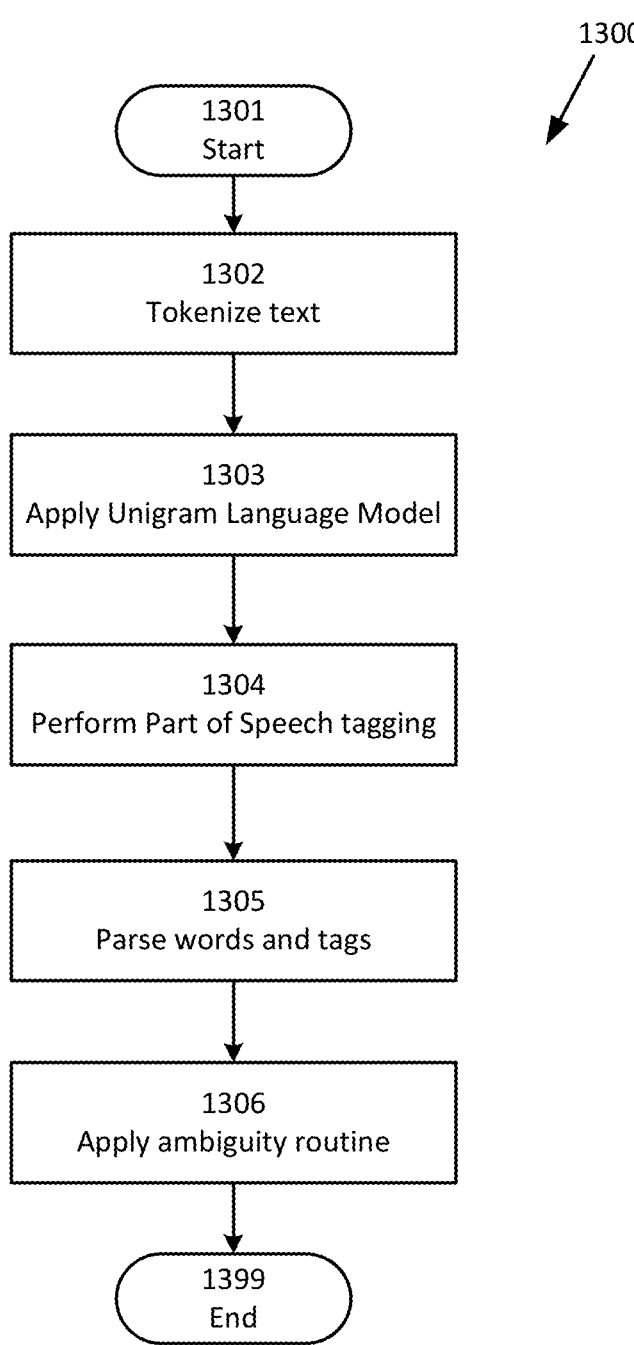
FIG. 13 is a flow diagram depicting a method for checking and resolving ambiguities, according to one embodiment.

Referring now to FIG. 13, there is shown a flow diagram depicting a method 1300 for checking and resolving ambiguities in an automated fashion, according to one embodiment. In at least one embodiment, the steps of method 1300 can be performed by software running on any suitable computing device, such as device 101 of FIG. 1, server 110 of FIG. 2, or client device 108 of FIG. 2.

The method begins 1301. In general, the meaning of a sentence is understood by reading each word in sequence. Thus, as a first step, the text is tokenized 1302, breaking it into smaller parts: paragraphs into sentences, sentences into words, and words into characters. In at least one embodiment, a lossy tokenization approach can be applied, taking into account the nature of the structured text, Latin alphabet, and the amount of data to train.

In at least one embodiment a Unigram Language Model is applied 1303, which is a type of statistical language model that delivers a probability distribution over sequences of words providing context to distinguish between words and phrases that sound similar. A distribution model is obtained, and then a dynamic algorithm is used to find the most likely sequence of states; one example is the Viterbi algorithm.

As a next step, Part of Speech (POS) tagging 1304 is performed, which categorizes words based upon their function within the sentence (e.g., verb, noun, adjective, and the like). POS tagging 1304 is useful because such tags can reveal meaning about a word and its neighbors (for example, nouns are often preceded by determiners and adjectives, verbs by nouns, and the like). Furthermore, tags can provide useful insight as to syntactic structure, and can help with labeling named entities such as roles (e.g., operator) and/or equipment (e.g., Handling Bleeding Valve (HBV)).

In at least one embodiment, POS tagging 1304 is performed by applying a Hidden Markov model. A Markov chain can be a relevant model because it makes the strong assumption that to predict the future in the sequence, only the current state need be considered, not past ones. For example, an "Open Valve HBV" action need only assume that valve HBV was closed before the action was performed. These assumptions are important because sometimes it is necessary to predict a sequence of states that may not be explicitly written in the document.

Next, a parsing step 1305 is performed, wherein the words (along with their POS tags) are analyzed and combined together so a machine learning model can derive the meaning of the overall sentence. In at least one embodiment, syntactic parsing is performed, resulting in a parse tree which converts the sentence into a tree whose leaves hold POS tags while the remainder of the tree indicates how the words are joined together to make the overall sentence.

In at least one embodiment, syntactic parsing is performed as follows:

Transform context-free grammar (CFG) to Chomsky Normal Form

Apply Cocke-Younger-Kasami Algorithm

Determine Probabilistic Context-Free Grammar

Apply a supervised learning algorithm

The output of this process are words with POS tagging and inside-outside-beginning (IOB) tagging, indicating, for each chunk a beginning (B) of the chunk, inside (I) of each word type, and any outside tokens outside (O). This tagging process provides a mechanism for turning a written sentence into a model that can be fed into a machine language algorithm. One example of such tagging is as follows: Operator close HBV (B_NP I_VP O_NP).

Once parsing 1305 has been completed, an ambiguity routine is applied 1306, for example using a machine learning algorithm. One example of such a routine is syntactic analysis algorithm, including any known techniques for natural language processing (NLP).

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for converting a standard operating procedure defining a process into a non-ambiguous single state machine architecture, comprising:

at an input device, receiving as input a standard operating procedure comprising a series of instructions, wherein each instruction specifies an action; and for each action specified by an instruction in the standard operating procedure:

at a hardware processor, automatically determining whether the instruction specifies the action in an ambiguous manner;

at the hardware processor, responsive to the instruction being specified in an ambiguous manner:

obtaining a description of the ambiguity; and removing the ambiguity from the instruction;

at the input device, obtaining a description of the action to be performed;

at the hardware processor, based on the obtained description, automatically generating a predefined input for the single state machine architecture; and at an electronic storage device, storing the predefined input for the single state machine architecture;

wherein automatically determining whether the instruction specifies the action in an ambiguous manner comprises:

obtaining text comprising words specifying the action;

tokenizing the text;

applying a language model to the tokenized text;

tagging parts of speech in the tokenized text, to generate a plurality of tags;

performing syntactic parsing on at least one of the tags and the words in the text; and applying a machine-learning based ambiguity routine to the output of the syntactic parsing step, to automatically determine whether the action is specified in an ambiguous manner.

2. The method of claim 1, wherein obtaining a description of the action to be performed comprises:

receiving input from an individual capturing information about the action by observation.

3. The method of claim 2, wherein the individual is a subject matter expert.

4. The method of claim 2, wherein the instruction specifies an action to be performed on a piece of equipment, and wherein receiving input from the individual capturing information about the action comprises receiving input from the individual capturing information about the action by observation of the equipment to be acted upon.

5. The method of claim 4, wherein receiving input from the individual capturing information about the action comprises receiving at least one selected from the group consisting of:

a field location of the equipment to be acted upon;

at least one image of the equipment;

at least one image of the environment surrounding the equipment;

at least one verb specifying the action to be performed on the equipment;

a name of the equipment; and a reference to a step of the standard operating procedure.

6. The method of claim 1, wherein automatically determining whether the instruction specifies the action in an ambiguous manner further comprises at least one selected from the group consisting of:

automatically determining whether all terminology used in the instruction is unequivocal;

automatically determining whether the action specified by the instruction references a system or a single component;

automatically determining whether the action specified by the instruction specifies a single object or an indefinite number of objects;

automatically determining whether performing the action requires any previous operational know-how.

7. The method of claim 1, wherein the process defined by the standard operating procedure comprises a process for transforming a first material into a second material.

8. The computer-implemented method of claim 1, wherein the language model comprises a Unigram Language Model.

9. A computer-implemented method for converting a standard operating procedure defining a process into a non-ambiguous single state machine architecture, comprising:

at an input device, receiving as input a standard operating procedure comprising a series of instructions, wherein each instruction specifies an action; and for each action specified by an instruction in the standard operating procedure:

at a hardware processor, determining whether the instruction specifies the action in an ambiguous manner;

at the hardware processor, responsive to the instruction being specified in an ambiguous manner:

obtaining a description of the ambiguity; and removing the ambiguity from the instruction;

at the input device, obtaining a description of the action to be performed;

at the hardware processor, based on the obtained description, automatically generating a predefined input for the single state machine architecture; and at an electronic storage device, storing the predefined input for the single state machine architecture;

wherein the process defined by the standard operating procedure comprises a process for transforming a first material into a second material by performing at least one selected from the group consisting of:

applying pressure;

applying temperature; and adding additional materials.

10. A non-transitory computer-readable medium for converting a standard operating procedure defining a process into a nonambiguous single state machine architecture, comprising instructions stored thereon, that when performed by a hardware processor, perform the steps of:

causing an input device to receive as input a standard operating procedure comprising a series of instructions, wherein each instruction specifies an action; and for each action specified by an instruction in the standard operating procedure, performing the steps of:

automatically determining whether the instruction specifies the action in an ambiguous manner;

responsive to the instruction being specified in an ambiguous manner:

obtaining a description of the ambiguity; and removing the ambiguity from the instruction;

causing the input device to obtain a description of the action to be performed;

based on the obtained description, automatically generating a predefined input for the single state machine architecture; and causing an electronic storage device to store the predefined input for the single state machine architecture;

wherein automatically determining whether the instruction specifies the action in an ambiguous manner comprises:

obtaining text comprising words specifying the action;

tokenizing the text;

applying a language model to the tokenized text;

tagging parts of speech in the tokenized text, to generate a plurality of tags;

performing syntactic parsing on at least one of the tags and the words in the text; and applying a machine-learning based ambiguity routine to the output of the syntactic parsing step, to automatically determine whether the action is specified in an ambiguous manner.

11. The non-transitory computer-readable medium of claim 10, wherein causing the input device to obtain a description of the action to be performed comprises:

causing the input device to receive input from an individual capturing information about the action by observation.

12. The non-transitory computer-readable medium of claim 11, wherein the individual is a subject matter expert.

13. The non-transitory computer-readable medium of claim 11, wherein the instruction specifies an action to be performed on a piece of equipment, and wherein causing the input device to receive input from the individual capturing information about the action comprises causing the input device to receive input from the individual capturing information about the action by observation of the equipment to be acted upon.

14. The non-transitory computer-readable medium of claim 13, wherein causing the input device to receive input from the individual capturing information about the action comprises causing the input device to receive at least one selected from the group consisting of:

a field location of the equipment to be acted upon;

at least one image of the equipment;

at least one image of the environment surrounding the equipment;

at least one verb specifying the action to be performed on the equipment;

a name of the equipment; and a reference to a step of the standard operating procedure.

15. The non-transitory computer-readable medium of claim 10, wherein determining whether the instruction specifies the action in an ambiguous manner further comprises at least one selected from the group consisting of:

automatically determining whether all terminology used in the instruction is unequivocal;

automatically determining whether the action specified by the instruction references a system or a single component;

automatically determining whether the action specified by the instruction specifies a single object or an indefinite number of objects;

automatically determining whether performing the action requires any previous operational know-how.

16. The non-transitory computer-readable medium of claim 10, wherein the process defined by the standard operating procedure comprises a process for transforming a first material into a second material.

17. The non-transitory computer-readable medium of claim 10, wherein the language model comprises a Unigram Language Model.

18. A non-transitory computer-readable medium for converting a standard operating procedure defining a process into a nonambiguous single state machine architecture, comprising instructions stored thereon, that when performed by a hardware processor, perform the steps of:

causing an input device to receive as input a standard operating procedure comprising a series of instructions, wherein each instruction specifies an action; and for each action specified by an instruction in the standard operating procedure, performing the steps of:

determining whether the instruction specifies the action in an ambiguous manner;

responsive to the instruction being specified in an ambiguous manner:

obtaining a description of the ambiguity; and removing the ambiguity from the instruction;

causing the input device to obtain a description of the action to be performed;

based on the obtained description, automatically generating a predefined input for the single state machine architecture; and causing an electronic storage device to store the predefined input for the single state machine architecture;

wherein the process defined by the standard operating procedure comprises a process for transforming a first material into a second material by performing at least one selected from the group consisting of:

applying pressure;

applying temperature; and adding additional materials.

19. A system for converting a standard operating procedure defining a process into a non-ambiguous single state machine architecture, comprising:

an input device, configured to receive as input a standard operating procedure comprising a series of instructions, wherein each instruction specifies an action;

a hardware processor, communicatively coupled to the input device, configured to, for each action specified by an instruction in the standard operating procedure:

automatically determine whether the instruction specifies the action in an ambiguous manner;

responsive to the instruction being specified in an ambiguous manner:

obtain a description of the ambiguity; and remove the ambiguity from the instruction;

cause the input device to obtain a description of the action to be performed; and based on the obtained description, automatically generate a predefined input for the single state machine architecture; and an electronic storage device, communicatively coupled to the hardware processor, configured to store each generated predefined input for the single state machine architecture;

wherein automatically determining whether the instruction specifies the action in an ambiguous manner comprises:

obtaining text comprising words specifying the action;

tokenizing the text;

applying a language model to the tokenized text;

tagging parts of speech in the tokenized text, to generate a plurality of tags;

performing syntactic parsing on at least one of the tags and the words in the text; and applying a machine-learning based ambiguity routine to the output of the syntactic parsing step, to automatically determine whether the action is specified in an ambiguous manner.

20. The system of claim 19, wherein causing the input device to obtain a description of the action to be performed comprises:

causing the input device to receive input from an individual capturing information about the action by observation.

21. The system of claim 20, wherein the individual is a subject matter expert.

22. The system of claim 20, wherein the instruction specifies an action to be performed on a piece of equipment, and wherein causing the input device to receive input from the individual capturing information about the action comprises receiving input from the individual capturing information about the action by observation of the equipment to be acted upon.

23. The system of claim 22, wherein causing the input device to receive input from the individual capturing information about the action comprises receiving at least one selected from the group consisting of:

a field location of the equipment to be acted upon;

at least one image of the equipment;

at least one image of the environment surrounding the equipment;

at least one verb specifying the action to be performed on the equipment;

a name of the equipment; and a reference to a step of the standard operating procedure.

24. The system of claim 19, wherein automatically determining whether the instruction specifies the action in an ambiguous manner further comprises at least one selected from the group consisting of:

automatically determining whether all terminology used in the instruction is unequivocal;

automatically determining whether the action specified by the instruction references a system or a single component;

automatically determining whether the action specified by the instruction specifies a single object or an indefinite number of objects;

automatically determining whether performing the action requires any previous operational know-how.

25. The system of claim 19, wherein the process defined by the standard operating procedure comprises a process for transforming a first material into a second material.

26. The system of claim 19, wherein the language model comprises a Unigram Language Model.

27. A system for converting a standard operating procedure defining a process into a non-ambiguous single state machine architecture, comprising:

an input device, configured to receive as input a standard operating procedure comprising a series of instructions, wherein each instruction specifies an action;

a hardware processor, communicatively coupled to the input device, configured to, for each action specified by an instruction in the standard operating procedure:

determine whether the instruction specifies the action in an ambiguous manner;

responsive to the instruction being specified in an ambiguous manner:

obtain a description of the ambiguity; and remove the ambiguity from the instruction;

cause the input device to obtain a description of the action to be performed; and based on the obtained description, automatically generate a predefined input for the single state machine architecture; and an electronic storage device, communicatively coupled to the hardware processor, configured to store each generated predefined input for the single state machine architecture;

wherein the process defined by the standard operating procedure comprises a process for transforming a first material into a second material by performing at least one selected from the group consisting of:

applying pressure;

applying temperature; and adding additional materials.

\* \* \* \* \*